United States Patent
Matejka et al.

(10) Patent No.: US 11,314,405 B2
(45) Date of Patent: Apr. 26, 2022

(54) REAL-TIME SCRUBBING OF ONLINE VIDEOS

(71) Applicant: AUTODESK, INC., San Rafael, CA (US)

(72) Inventors: Justin Frank Matejka, Newmarket (CA); Tovi Grossman, Toronto (CA); George Fitzmaurice, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 344 days.

(21) Appl. No.: 13/651,317

(22) Filed: Oct. 12, 2012

(65) Prior Publication Data

US 2013/0097508 A1 Apr. 18, 2013
US 2018/0129407 A9 May 10, 2018

Related U.S. Application Data

(60) Provisional application No. 61/547,651, filed on Oct. 14, 2011.

(51) Int. Cl.
*G06F 3/0485* (2013.01)
*H04L 29/06* (2006.01)
(Continued)

(52) U.S. Cl.
CPC ...... *G06F 3/04855* (2013.01); *H04L 65/4084* (2013.01); *H04L 65/4092* (2013.01); *H04N 21/2343* (2013.01); *H04N 21/234309* (2013.01); *H04N 21/234336* (2013.01); *H04N 21/234363* (2013.01); *H04N 21/440263* (2013.01);
(Continued)

(58) Field of Classification Search
CPC ........... G06F 3/04855; G06F 17/30017; G06F 17/30799; G06F 17/30843; G06F 17/30038; G06F 17/30781; G06F 17/30784; G06F 17/212; G06F 3/0485; H04N 21/23439; H04N 7/17318; H04N 21/47217; H04N 21/2743; H04N 21/47202; H04N 21/23418; H04N 21/234345; H04N 21/234381; H04N 21/2662; H04N 21/44029; H04N 21/2746; H04N 21/8549; H04N 19/147; H04N 19/117; H04N 21/2343; H04N 21/234309; H04N 21/234336; H04N 21/234363;
(Continued)

(56) References Cited

U.S. PATENT DOCUMENTS

5,377,051 A * 12/1994 Lane .................... G11B 5/0086
348/E5.007
5,818,439 A * 10/1998 Nagasaka ......... G06F 17/30793
348/E7.073
(Continued)

*Primary Examiner* — Justin R. Blaufeld
(74) *Attorney, Agent, or Firm* — Artegis Law Group, LLP (57) ABSTRACT

A method for traversing a streaming video file includes receiving a representative streaming video file that includes less information than a higher-resolution streaming video file and spans the entire streaming video file. Based on navigation information associated with the representative streaming video file, a playback engine navigates to a different portion of the streaming video file. The navigation information may be based on input information received from a viewer of the streaming video file. One advantage of the disclosed method is that it enables fast and accurate navigation of a streaming video.

18 Claims, 3 Drawing Sheets

(51) Int. Cl.
  *H04N 21/4402* (2011.01)
  *H04N 21/6587* (2011.01)
  *H04N 21/2343* (2011.01)
  *G06F 3/04855* (2022.01)
  *H04L 65/612* (2022.01)
  *H04L 65/613* (2022.01)

(52) U.S. Cl.
  CPC . *H04N 21/440281* (2013.01); *H04N 21/6587* (2013.01); *H04N 21/234345* (2013.01)

(58) Field of Classification Search
  CPC ... H04N 21/440263; H04N 21/440281; H04N 21/6587; H04L 65/4084; H04L 65/4092
  USPC .......................................................... 715/720
  See application file for complete search history.

(56) References Cited

U.S. PATENT DOCUMENTS

| | | | | |
|---|---|---|---|---|
| 5,986,717 A * | 11/1999 | Fairhurst | | H04N 5/272 348/579 |
| 6,139,197 A * | 10/2000 | Banks | | H04N 1/00283 348/E7.071 |
| 6,181,336 B1 * | 1/2001 | Chiu | | G06T 1/00 715/736 |
| 6,385,641 B1 * | 5/2002 | Jiang | | H04L 29/06 709/203 |
| 6,400,378 B1 * | 6/2002 | Snook | | G11B 27/034 707/999.102 |
| 6,677,961 B1 * | 1/2004 | Bhat | | G06F 17/30843 715/723 |
| 6,807,306 B1 * | 10/2004 | Girgensohn et al. | | 382/225 |
| 6,879,634 B1 * | 4/2005 | Oz | | H04L 29/06 375/240.25 |
| 7,058,721 B1 * | 6/2006 | Ellison | | G11B 27/031 348/E5.008 |
| 8,032,832 B2 * | 10/2011 | Russ | | G06F 17/30056 715/205 |
| 8,086,691 B2 * | 12/2011 | Viger | | H04L 63/101 709/217 |
| 8,286,218 B2 * | 10/2012 | Pizzurro | | H04N 7/17336 705/27.1 |
| 8,321,905 B1 * | 11/2012 | Streeter | | H04N 21/4384 709/231 |
| 8,390,744 B2 * | 3/2013 | Sullivan et al. | | 348/731 |
| 8,391,370 B1 * | 3/2013 | Mukherjee | | H04N 19/166 375/240.24 |
| 8,503,523 B2 * | 8/2013 | Williams | | G06F 17/30787 375/240.08 |
| 8,520,088 B2 * | 8/2013 | Deever | | H04N 9/87 348/222.1 |
| 8,676,882 B2 * | 3/2014 | Georgis | | H04N 7/17309 709/203 |
| 8,787,726 B2 * | 7/2014 | Rossi | | 386/224 |
| 8,938,548 B2 * | 1/2015 | Lewis | | H04N 7/17318 709/203 |
| 8,972,862 B2 * | 3/2015 | Haot | | G11B 27/031 386/278 |
| 9,160,960 B2 * | 10/2015 | Schwesinger | | H04N 21/431 |
| 9,171,577 B1 * | 10/2015 | Newman | | G11B 27/031 |
| 2002/0075572 A1 * | 6/2002 | Boreczky et al. | | 359/722 |
| 2002/0133247 A1 * | 9/2002 | Smith | | H04L 29/06 700/94 |
| 2002/0140719 A1 * | 10/2002 | Amir | | G06F 17/30017 715/716 |
| 2003/0234803 A1 * | 12/2003 | Toyama | | G06F 17/30787 715/716 |
| 2004/0197071 A1 * | 10/2004 | Zhang et al. | | 386/46 |
| 2004/0268400 A1 * | 12/2004 | Barde | | H04N 7/17318 725/94 |
| 2005/0047681 A1 * | 3/2005 | Hori | | G06F 17/30817 382/305 |
| 2005/0071782 A1 * | 3/2005 | Barrett | | H04N 5/45 715/838 |
| 2005/0195900 A1 * | 9/2005 | Han | | H04N 21/234327 375/240.21 |
| 2006/0026524 A1 * | 2/2006 | Ma et al. | | 715/713 |
| 2006/0064716 A1 * | 3/2006 | Sull | | G06F 17/30793 725/37 |
| 2006/0127059 A1 * | 6/2006 | Fanning | | 386/125 |
| 2006/0288392 A1 * | 12/2006 | Fleming | | H04N 5/765 725/94 |
| 2007/0016611 A1 * | 1/2007 | Wang | | G11B 27/34 |
| 2007/0019866 A1 * | 1/2007 | Ayres | | H04N 7/17318 382/232 |
| 2007/0056000 A1 * | 3/2007 | Pantalone | | H04N 21/44029 725/90 |
| 2007/0086669 A1 * | 4/2007 | Berger et al. | | 382/243 |
| 2007/0255844 A1 * | 11/2007 | Shen | | H04L 12/00 709/231 |
| 2008/0022005 A1 * | 1/2008 | Wu et al. | | 709/231 |
| 2008/0046939 A1 * | 2/2008 | Lu | | H04N 21/23424 725/90 |
| 2008/0059989 A1 * | 3/2008 | O'Connor et al. | | 725/9 |
| 2008/0183843 A1 * | 7/2008 | Gavin | | G06Q 30/06 709/217 |
| 2008/0184120 A1 * | 7/2008 | OBrien-Strain et al. | | 715/723 |
| 2008/0189752 A1 * | 8/2008 | Moradi et al. | | 725/105 |
| 2008/0271095 A1 * | 10/2008 | Shafton | | H04N 7/17318 725/87 |
| 2008/0310814 A1 * | 12/2008 | Bowra et al. | | 386/46 |
| 2009/0006368 A1 * | 1/2009 | Mei | | G06F 17/30796 |
| 2009/0007202 A1 * | 1/2009 | Williams | | G06F 17/30787 725/105 |
| 2009/0080853 A1 * | 3/2009 | Chen | | G06F 17/30787 386/241 |
| 2009/0157743 A1 * | 6/2009 | Li | | 707/104.1 |
| 2009/0174677 A1 * | 7/2009 | Gehani | | G06F 3/04847 345/173 |
| 2009/0249208 A1 * | 10/2009 | Song | | G11B 27/105 715/721 |
| 2009/0292819 A1 * | 11/2009 | Kandekar | | H04N 7/17318 709/231 |
| 2009/0322962 A1 * | 12/2009 | Weeks | | H04N 7/17318 348/726 |
| 2010/0153574 A1 * | 6/2010 | Lee | | H04L 12/1827 709/231 |
| 2010/0208086 A1 * | 8/2010 | Kothandaraman | | H04N 5/23232 348/208.4 |
| 2010/0242066 A1 * | 9/2010 | Tseng | | H04N 7/17327 725/38 |
| 2010/0251121 A1 * | 9/2010 | Rosser et al. | | 715/720 |
| 2010/0303440 A1 * | 12/2010 | Lin | | H04N 5/76 386/241 |
| 2011/0191679 A1 * | 8/2011 | Lin | | G06F 17/30781 715/716 |
| 2012/0050012 A1 * | 3/2012 | Alsina | | H04N 21/4126 340/10.1 |
| 2012/0054615 A1 * | 3/2012 | Lin | | G06F 17/30849 715/719 |
| 2012/0070129 A1 * | 3/2012 | Lin | | H04N 21/234327 386/278 |
| 2012/0084454 A1 * | 4/2012 | Lindquist et al. | | 709/231 |
| 2012/0166950 A1 * | 6/2012 | Frumar | | G06F 3/04883 715/719 |
| 2012/0239642 A1 * | 9/2012 | Bliss et al. | | 707/722 |
| 2013/0036233 A1 * | 2/2013 | Orleth | | 709/231 |
| 2013/0080895 A1 * | 3/2013 | Rossman | | G06F 3/04883 715/720 |
| 2013/0120454 A1 * | 5/2013 | Shechtman et al. | | 345/635 |
| 2013/0132605 A1 * | 5/2013 | Kocks | | H04N 21/262 709/231 |
| 2014/0109140 A1 * | 4/2014 | Yao et al. | | 725/41 |
| 2014/0310601 A1 * | 10/2014 | Matejka et al. | | 715/720 |

* cited by examiner

REAL-TIME SCRUBBING OF ONLINE VIDEOS

CROSS-REFERENCE TO RELATED APPLICATION(S)

The present application claims priority to U.S. Provisional Patent Application No. 61/547,561, filed Oct. 14, 2011, the entire contents of which are incorporated by reference herein.

BACKGROUND OF THE INVENTION

Field of the Invention

The present invention relates generally to video playback and, more specifically, to real-time scrubbing of on-line videos.

Description of the Related Art

Manually searching for a specific location in a digital video file by "scrubbing," i.e., by moving a cursor along a timeline slider associated with the video, can be performed fairly conveniently with a downloaded video. This is because the current selected frame of the downloaded video can generally be accessed and displayed almost immediately after the cursor is positioned at any point on the timeline slider. This allows a viewer to quickly determine what portion of the video corresponds to the current cursor position and whether the cursor should be repositioned to find the target location in the video. However, due to the long wait time associated with downloading longer videos before viewing of the video can begin, video streaming has become a popular alternative to video downloading.

Streaming video, in which audio-visual media are constantly received and presented to an end user while being delivered by a provider, allows viewing to begin after a relatively short period of data buffering has taken place. This is because the bulk of the downloading process takes place while the video is being presented to the end user. However, in contrast to downloaded videos, which are fully cached, searching for a specific location in a streaming video can be problematic. Specifically, when an end user searches for a specific location in a streaming video by scrubbing a cursor position forward or backward along a timeline associated with the video, the end user must wait for the data buffering process to complete before the portion of the video corresponding to the current cursor location is displayed. This is because streaming video players are generally unable to display video frames until a certain level of buffering has taken place. Unfortunately, such display latency occurs each time the cursor is repositioned, even if the cursor is only repositioned a very short distance along the video time line. Because the cursor is generally repositioned many times in the course of navigating to a target location in a video, even when the requisite data buffering takes as little as 5 or 10 seconds, navigation performance is significantly degraded. Furthermore, since video information corresponding to cursor location is not displayed during navigation of a timeline slider, an end user can only guess where to reposition the cursor in the course of navigating the video and then must wait for video to be displayed after data buffering is completed for the latest cursor position. Thus, the scrubbing experience for the end user can be very choppy, time-consuming, and frustrating.

As the foregoing illustrates, there is a need in the art for a more effective way to navigate an on-line video.

SUMMARY OF THE INVENTION

One embodiment of the present invention sets forth a computer-implemented method for traversing a streaming video file. The method includes receiving a representative streaming video file that includes less information than a higher-resolution streaming video file and spans the entire streaming video file. Based on navigation information associated with the representative streaming video file, a playback engine navigates to a different portion of the streaming video file. The navigation information may be based on input information received from a viewer of the streaming video file.

One advantage of the disclosed method is it enables fast and accurate navigation of a streaming video. This is because, unlike conventional video navigation, an end user does not suffer the latency during navigation caused by a video player waiting for a buffering process to complete before displaying streaming video. Such latency is inherent in prior art navigation techniques since navigation operations are performed across the actual, unbuffered video stream.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

One embodiment of the present invention sets forth a computer-implemented method for real-time scrubbing of a streaming video. The method includes downloading a low-resolution version of the video and using the low-resolution version of the streaming video for display to facilitate navigation the video. Because the low-resolution version is fully downloaded before navigating the video takes place, any portion of the low-resolution version is available and any appropriate frame can be immediately displayed whenever a cursor is moved along a video timeline slider. Thus, during navigation along the video timeline slider, the low-resolution version of the video is displayed instead of the streaming, high-resolution version of the video. Once navigation ends, for example when a mouse button used to control the cursor is released, the display can snap back to the high-resolution streaming video and normal viewing of the video begins.

Figure 1:
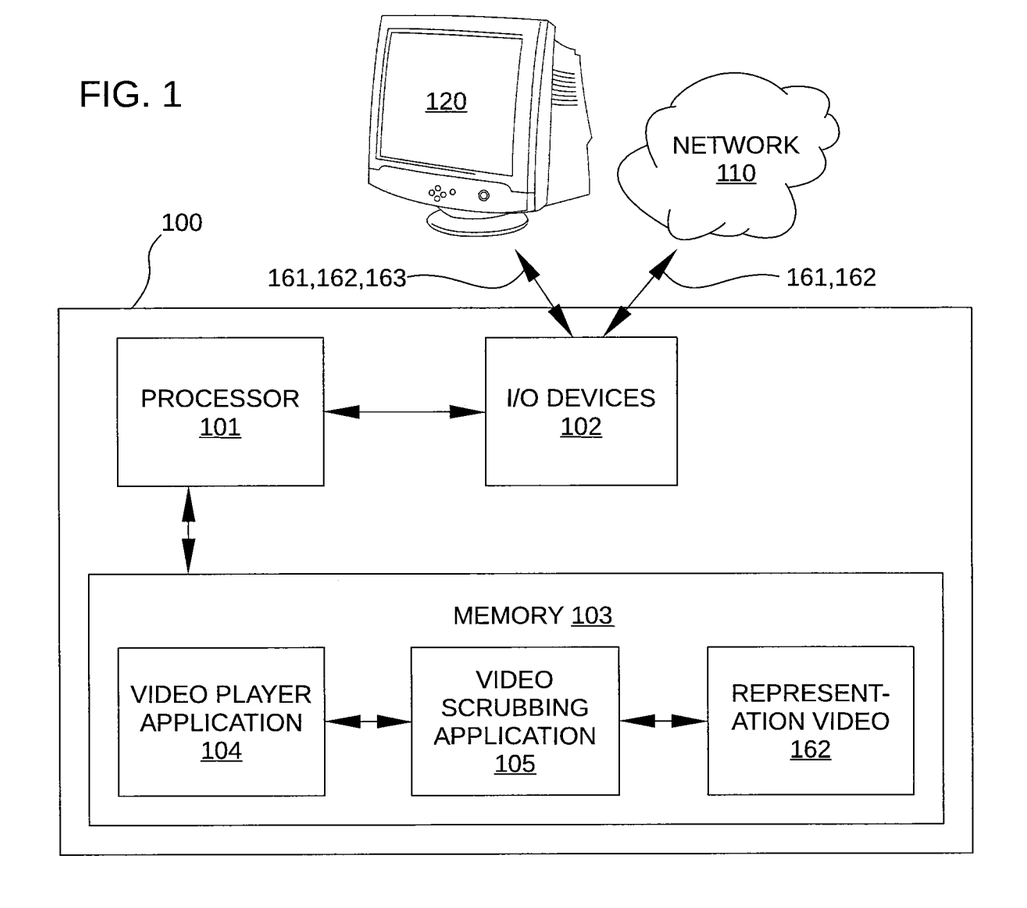
FIG. 1 is a block diagram of a computing device configured to implement one or more embodiments of the present invention.

FIG. 1 is a block diagram of a computing device 100 configured to implement one or more embodiments of the present invention. Computing device 100 may be a desktop computer, a laptop computer, a smart phone, a personal digital assistant (PDA), video game console, set top console, tablet computer, or any other type of computing device configured to receive input, process data, and display images, and is suitable for practicing one or more embodiments of the present invention. Computing device 100 includes a processor 101, input/output (I/O) devices 102, and a memory block 103, and is configured to run a video player application 104 that resides in memory block 103. Computing device 100 is configured to receive input from an end user and from a video streaming source, such as a network connection to the Internet or any other data network. Computing device 100 is further configured to display graphical images and/or video to the end user via I/O devices 102. It is noted that the computing device described herein is illustrative and that any other technically feasible configurations fall within the scope of the invention.

Processor 101 may be any suitable processor implemented as a central processing unit (CPU), a graphics processing unit (GPU), an application-specific integrated circuit (ASIC), a field programmable gate array (FPGA), or another type of processing unit. Processor 101 is configured to execute program instructions associated with a particular instruction set architecture (ISA) specific to processor 101, including video player application 104 and a video scrubbing application 105. Processor 101 is also configured to receive data from and transmit data to I/O devices 102 and memory 103.

I/O devices 102 include devices that may be used to input data to computing device 100 or devices that output data from computing device 100. I/O devices 102 may include input devices, such as a joystick, a switch, a microphone, a video camera, a keyboard, a mouse, or a touchpad, among others. I/O devices 102 may also include one or more output devices, such as a one or more display screens, a speaker, a projector, or a lamp, among others. In addition, I/O devices 102 include devices used to input data to or output data from computing device 100, such as an Ethernet port, a serial port, a compact disc (CD) drive, or a digital video disc (DVD) drive, among others. In some embodiments, one or more of I/O devices 102 are configured to couple computing device 100 to a network 110.

I/O devices 102 also include a display device 120. Display device 120 may be a computer monitor, a video display screen, a display apparatus incorporated into a hand held device, or any other technically feasible display screen configured to present video media to an end user. In some embodiments, display device 120 is a terminal window displayed on another display device, such as a video display window that has been opened by video player application 104.

Network 110 may be any technically feasible type of communications network that allows data to be exchanged between computing device 100 and external entities or devices, such as a video archive database or a provider of on-demand streaming media. For example, network 110 may include a wide area network (WAN), a local area network (LAN), a wireless (WiFi) network, and/or the Internet, among others.

Memory block 103 may be a hard disk, a flash memory stick, a compact disc read-only memory (CD-ROM), a random access memory (RAM) module, or any other type of volatile or non-volatile memory unit capable of storing data. Memory 103 includes various software programs that can be executed by processor 101, including video player application 104 and, in some embodiments, video scrubbing application 105, as described in greater detail below. In other embodiments, video scrubbing application 105 resides on a server, and results of navigation, described below, are pushed to computing device 100, instead of being generated locally.

Video player application 104 may be any computer application or playback engine configured to play streaming video content for an end user on display device 120, and comprises program instructions that can be executed by processor 101. For example, video player application 104 may be a proprietary application provided to an end user by a provider of on-demand streaming media and installed on computing device 100. Alternatively, video player application 104 may be a non-proprietary third-party application installed on computing device 100. Video player application 104 is configured to present streaming, i.e., un-cached, video content on display device 120, such video content being received by computing device 100 via network 110. In the embodiment illustrated in FIG. 1, such un-cached video content is depicted as a streaming video 161. Generally, a small portion of streaming video 161 is buffered by video player application 104, except when navigation by an end user takes place via video scrubbing application 105, in which case video player application 104 pauses until receiving a frame number or time code from video scrubbing application 105 that corresponds to a portion of streaming video 161 selected by an end user for viewing. Video player application 104 then buffers a suitable number of frames of streaming video 161 and then presents video content starting at the desired frame number or time code.

Video scrubbing application 105 is a software application configured to facilitate navigation when viewing streaming video content. In operation, embodiments of video scrubbing application 105 enhance real-time scrubbing of a streaming video by displaying a representative video 162 of streaming video 161 on display device 120 so that representative video 162 of streaming video 161 can be used for latency-free navigation to a desired location in streaming video 161. In some embodiments, representative video 162 of the streaming video is configured as a complete video file and can be cached in a suitable location in computing device 100, such as in memory 103. Furthermore, in some embodiments, video player application 104 receives data from an end user of computing device 100 via a keyboard, mouse, touch pad, and/or other suitable input devices, including a smart phone or digital tablet configured to communicate with computing device 100. Thus, a mouse, touchpad, or other input device can be used by an end user as a navigation device to traverse from one location in streaming video 161 to another while viewing streaming video 161. Such navigation can be performed by changing the position of a pointer or cursor on a timeline slider associated with streaming video 161, the position of the cursor being communicated to video scrubbing application 105 as navigation information 163.

Figure 2:
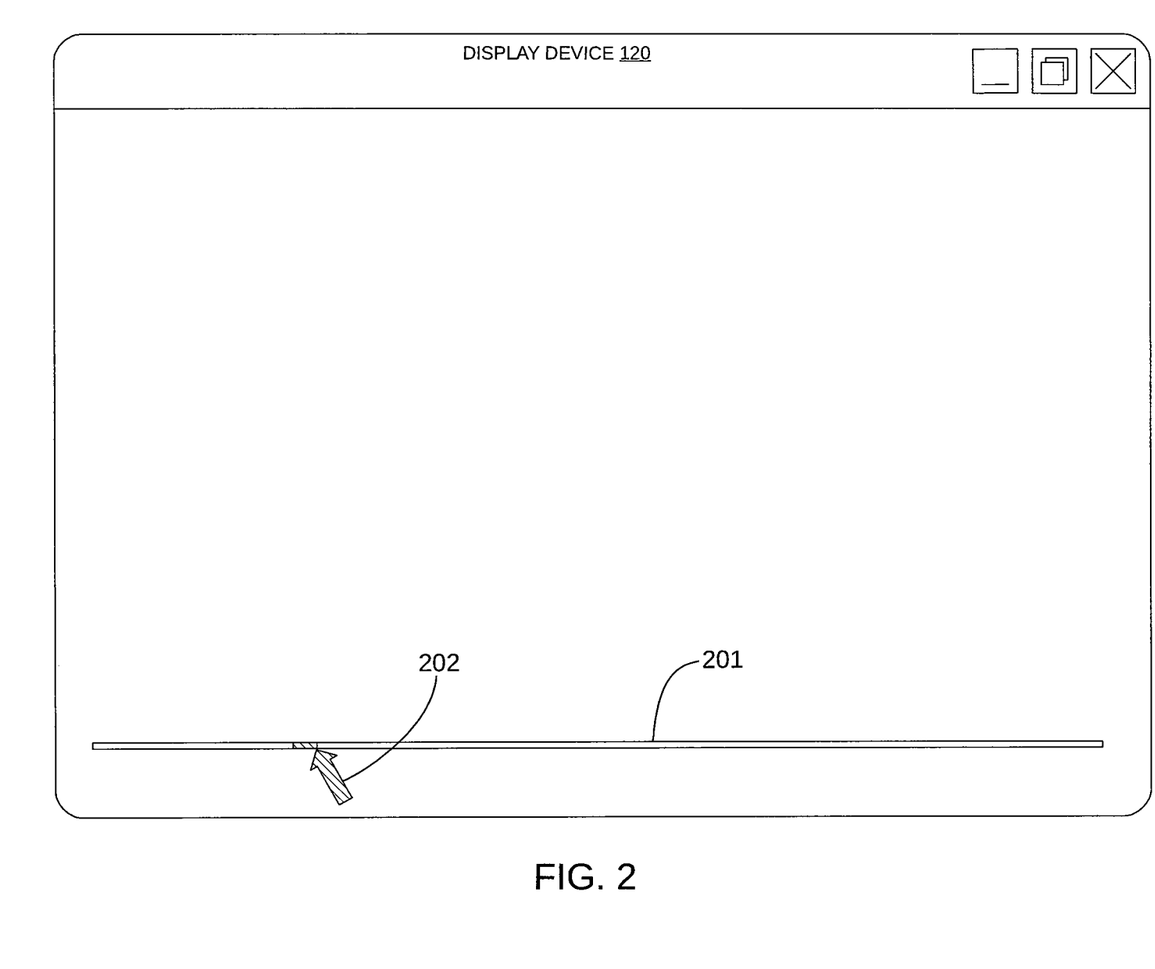
FIG. 2 is a conceptual illustration of a graphical interface that includes a cursor and a timeline slider, according to one embodiment of the present invention.

FIG. 2 is a conceptual illustration of display device 120 that includes a cursor 202 and a timeline slider 201, according to one embodiment of the present invention. As shown, display device 120 is configured as a terminal window displayed on a portion of a display screen. Cursor 202 is an indicator used to show the position on display device 120 that responds to position and other input from a human interface pointing device, such as a mouse or remote control device. Timeline slider 201, which may also be referred to as a track bar, is an object in display device 120 with which a user may select a time value in a streaming video by moving cursor 202. As shown, when an end user wants to navigate to a particular location in a streaming video being displayed on display device 120, cursor 202 is positioned on timeline slider 201. Cursor 202 is then activated, for example by holding a button on a controller, mouse, or other suitable input device, and dragged or "scrubbed" to a desired location on timeline slider 201. During such a navigation process, representative video 162 is used to provide feedback to the end user regarding the currently selected location in streaming video 161. Thus, because representative video 162 is a fully buffered video file, appropriate frames are displayed with no noticeable latency, thereby greatly facilitating the navigation process. In some embodiments, cursor position when off of timeline slider 201 can be used to select either streaming video 161 or representative video 162 for display on display device 120. For example, positioning cursor 202 in an upper region of display device 120 may select streaming video 161 and positioning cursor 202 in a lower region of display device 120 may select representative video 162 for display on display device 120.

To avoid unwanted and distracting latencies during video scrubbing of streaming video 161, representative video 162 is presented on display device 120 during the video scrubbing process. Thus, as the end user navigates timeline slider 201 associated with streaming video 161 by using cursor 202, a suitable frame is selected from representative video 162 and is displayed on display device 120. The selected frame shown on display device 120 corresponds to the location on timeline slider 201 indicated by cursor 202. Because representative video 162 of streaming video 161 includes significantly less information than streaming video 161, representative video 162 can be quickly downloaded and fully cached as a complete video file prior to or in an initial stage of viewing streaming video 161. Being fully cached, representation 161 can be scrubbed in real time and used to quickly locate a desired scene in streaming video 161, i.e., without the latency associated with data buffering each time the cursor is repositioned during navigation. Once navigation is paused or ended, video scrubbing application 105 provides a frame number, time code, or other indexing information to video player application 104 that indicates the point in streaming video 161 selected by the end user during navigation. Video player application 104 then requests the appropriate frames of streaming video 161 from the streaming video server, buffers a suitable number of frames of streaming video 161, and snaps back to streaming video 161 to present the selected video content. Thus, an end-user can freely navigate to any point in streaming video 161 and only experiences latency after navigation has been paused or completed and the desired portion of streaming video 161 is being buffered.

In some embodiments, during navigation, representative video 162 is overlayed on streaming video 161, i.e., frames of representative video 162 are displayed on display device 120 with substantially the same dimensions as streaming video 161. For example, both streaming video 161 and representative video 162 may both be displayed as full-screen videos, even though representative video 162 has significantly lower resolution than streaming video 161. Consequently, objects in representative video 162 are located in the same positions on display device 120 as in streaming video 161. In this way, a smooth visual transition between representative video 162 and streaming video 161 is created that avoids the visual disconnect and viewer disorientation that occurs when switching between two different-sized videos of the same subject matter. This smooth transition facilitates the navigation process for an end user.

In some embodiments, representative video 162 comprises a low-resolution video, in which the x-y pixel resolution is significantly reduced compared to the resolution of streaming video 161. In such embodiments, representative video 162 may include very low-resolution frames, where the number of pixels per frame is a low as 1 percent of the number of pixels in a frame of streaming video 161. Human vision can tolerate substantial degradation in image resolution and still provide enough information for image recognition. For example, as little as 16×16 pixel images have been shown in the literature to be suitable for face recognition. Furthermore, human scene recognition on images with a resolution of 32×32 has been shown to be 93% of the recognition of a full resolution of 256×256 source, i.e., a high recognition rate despite having only 1.5 percent the number of pixels of the original. Thus, to facilitate short download time of and minimize storage requirements for representative video 162, the file size of representative video 162 can be greatly reduced when representative video 162 comprises a video having substantially lower x-y pixel resolution relative to streaming video 161. Even when frames in representative video 162 have fewer than 10% of the pixels of frames in streaming video 161, an end user can recognize the current location using representative video 162 and accurately navigate to a desired portion of streaming video 161.

In some embodiments, representative video 162 comprises a low-resolution video with a frame resolution that is significantly reduced compared to the frame resolution of streaming video 161. In other words, there is not a one-to-one correspondence between the total number of frames in representative video 162 and the total number of frames in streaming video 162. Thus, in such embodiments, representative video 162 is encoded with significantly fewer frames than streaming video 161, thereby reducing the file size of representative video 162. In one such embodiment, representative video 162 is encoded with a number of frames that is selected based on the pixel width of the timeline slider associated with streaming video 161, for example timeline slider 201 in FIG. 2. For example, a typical timeline slider has a pixel width of 600 to 800 pixels. During navigation, an end user cannot position a cursor on the timeline slider with greater precision than a single pixel width. Consequently, representative video 162 can be encoded with no more than one frame per pixel of the timeline slider without affecting the precision of end-user cursor placement. Considering that a full-length movie generally has a frame length on the order of 200,000 frames, the file size of representative video 162 can be reduced orders of magnitude compared to streaming video 161. As noted above, any reduction in the file size of representative video 162 reduces download time of representative video 162 and the amount of storage required for caching representative video 162.

In some embodiments, both the frame resolution and the x-y pixel resolution of representative video 162 can be selected to be significantly less for streaming video 161. In this way, the file size of representative video 162 can be greatly reduced—for example on the order of about 1 MB, even when streaming video 161 includes a full-length movie. In one such embodiment, representative video 162 is encoded with a frame count of 800 and an x-y pixel resolution of 100×134 pixels, so that representative video 162 has a file size of just a few MBs. Such embodiments are particularly beneficial for mobile devices that have limited download bandwidth.

In some embodiments, representative video 162 presents meta data associated with streaming video 161 encoded as a series of frames rather than a lower-resolution version of streaming video 161. Thus, in some embodiments, representative video 162 includes meta data associated with streaming video 161 or with content of streaming video 161, said meta data changing over the duration of the streaming video 161. Representative video 162 can include video frames that present the meta data associated with streaming video 161 in alpha-numeric, graphical or other formats. For example, when the content of streaming video 161 includes a sporting event, representative video 162 can include the game time, the current score, inning, etc. Alternatively, representative video 162 may present a specific portion of the frames making up streaming video 161, such as a close-up of a sporting event scoreboard.

Figure 3:
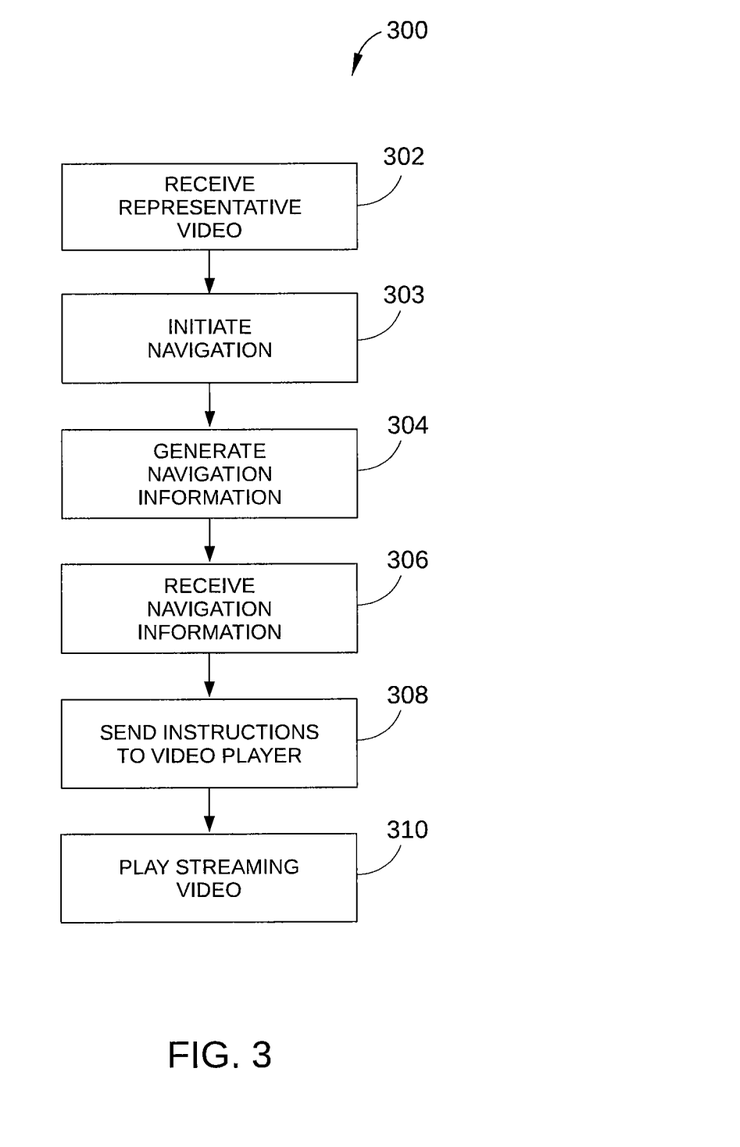
FIG. 3 is a flowchart of method steps for real-time scrubbing of a streaming video, according to one embodiment of the present invention.

FIG. 3 is a flowchart of method steps for real-time scrubbing of a streaming video, according to one embodiment of the present invention. Although the method steps are described in conjunction with the system of FIG. 1, persons skilled in the art will understand that any system configured to perform the method steps, in any order, is within the scope of the invention.

As previously described herein, prior to beginning method 300, representative video 162 of streaming video 161 is produced. Representative video 162 includes significantly less information than streaming video 161, while still spanning substantially all of streaming video 161. Representative video 162 may be a low-resolution version of streaming video 161, in which the x-y pixel resolution and/or frame count is significantly reduced.

As shown, the method 300 begins at step 302, where computing device 100 receives representative video 162 from an external source, such as a provider of on-demand streaming media, a video archive database, or the like. In some embodiments, representative video 162 is received in conjunction with streaming video 161. In one embodiment, representative video 162 is received immediately prior to the streaming of streaming video 161 to computing device 100, so that representative video 162 can be fully cached prior to the streaming process. In this way, navigation of streaming video 161 is enabled prior to the streaming process. Because representative video 162 is a relatively small file, delay prior to streaming is minimal. In another embodiment, representative video 162 is received concurrently with streaming video 161, so that streaming is not delayed at all. In such an embodiment, the ability to navigate to any point in streaming video 161 is slightly delayed, i.e., until all of representative video 162 has been fully cached. In another embodiment, an initial representation video associated with streaming video 161 is received prior to representative video 162, where the initial representation video includes substantially less information than representative video 162, and therefore is very quickly downloaded and cached. For example, the initial representation video may have significantly coarser x-y pixel resolution and/or frame count than representative video 162. In such an embodiment, navigation throughout streaming video 161 is quickly enabled even before representative video 162 has been fully cached, a feature particularly useful for mobile applications that have limited data bandwidth.

In step 303, a user initiates navigation by moving a cursor or other selection device over a timeline slider associated with streaming video 161. In response, video scrubbing application 105 causes video player application 104 to overlay representative video 162 on display device 120 in lieu of streaming video 161. Consequently, the end user actually navigates representative video 162 rather than streaming video 161 when moving the cursor on display device 120.

In step 304, the user generates navigation information by activating the cursor or other selection device at some point on the timeline slider associated with streaming video 161. Because representative video 162 is overlayed on display device 120 during navigation, the current location in representative video 162 is immediately displayed as the cursor is moved along the timeline slider and the end user has latency-free navigation. Whenever navigation is paused or halted, for example by releasing a button on the selection device or by positioning a cursor in the same location on the timeline slider, navigation information is sent to video scrubbing application 105.

In step 306, video scrubbing application 105 receives the navigation information generated in step 304 based on end user input. Such navigation information may include one or more of a frame number, a time code, or any other indexing information associated with the location in streaming video 161 at which navigation was paused or halted in step 304.

In step 308, video scrubbing application 105 sends the suitable instructions to video player application 104, the instructions indicating the point in streaming video 161 selected by the end user during navigation.

In step 310, video player application 104 requests the appropriate frames of streaming video 161 from the streaming video server, buffers a suitable number of frames of streaming video 161, and snaps back to streaming video 161 to present the selected video content.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A method for traversing streaming video files, the method comprising:

receiving an initial fully-downloaded representative video file of a first streaming video file that spans the entire length of the first streaming video file;

receiving and displaying a first portion of the first streaming video file;

receiving a first input of a navigation tool initiating navigation of the first streaming video file;

upon receiving the first input, displaying the initial fully-downloaded representative video file in place of the first streaming video file;

while displaying the initial fully-downloaded representative video file in place of the first streaming video file, receiving a second input of the navigation tool for a first selected portion of the first streaming video file;

based on navigation information that is associated with the initial fully-downloaded representative video file and that allows any portion of the first streaming video file to be selected, causing a playback engine to navigate to the first selected portion of the first streaming video file;

after receiving the initial fully-downloaded representative video file, receiving a fully-downloaded representative video file of the first streaming video file, wherein:

the fully-downloaded representative video is a complete version of the first streaming video file that includes less information than the first streaming video file, but comprises each and every frame included in the first streaming video file, and the fully-downloaded representative video file includes more information than the initial fully-downloaded representative video file;

receiving a third input of the navigation tool for a different portion of the first streaming video file; and based on navigation information associated with the fully-downloaded representative video file, causing the playback engine to navigate to the different portion of the first streaming video file.

2. The method of claim 1, wherein the fully-downloaded representative video file has a lower pixel resolution than the first streaming video file.

3. The method of claim 1, wherein a number of frames in the fully-downloaded representative video file selected by the navigation tool is based on a pixel width of a timeline slider associated with the first streaming video file.

4. The method of claim 1, wherein a total number of frames selected by the navigation tool from the fully-downloaded representative video file is no greater than a number of pixels that make up a width of a timeline slider associated with the first streaming video file.

5. The method of claim 1, wherein the fully-downloaded representative video file is received immediately prior to receiving the first streaming video file.

6. The method of claim 1, wherein the fully-downloaded representative video file is received concurrently with the first streaming video file.

7. The method of claim 1, wherein the navigation information is based on input information received from a viewer.

8. The method of claim 7, further comprising:
displaying the fully-downloaded representative video file in substantially same dimensions as the first streaming video when the input information is generated by the viewer.

9. The method of claim 1, wherein the fully-downloaded representative video file includes metadata associated with the first streaming video file that changes over a course of the first streaming video file.

10. The method of claim 1, wherein the navigation information is based on an input for a first selected portion of the first streaming video file.

11. The method of claim 1, wherein an input for the first selected portion of the first streaming video file is received from a viewer via the navigation tool.

12. A non-transitory computer readable medium storing instructions that, when executed by a processor, cause the processor to traverse streaming video files, by performing the steps of:

receiving an initial fully-downloaded representative video file of a first streaming video file that spans the entire length of the first streaming video file;

receiving and displaying a first portion of the first streaming video file;

receiving a first input of a navigation tool initiating navigation of the first streaming video file;

upon receiving the first input, displaying the initial fully-downloaded representative video file in place of the first streaming video file;

while displaying the initial fully-downloaded representative video file in place of the first streaming video file, receiving a second input of the navigation tool for a first selected portion of the first streaming video file;

based on navigation information that is associated with the initial fully-downloaded representative video file and that allows any portion of the first streaming video file to be selected, causing a playback engine to navigate to the first selected portion of the first streaming video file;

after receiving the initial fully-downloaded representative video file, receiving a fully-downloaded representative video file of the first streaming video file, wherein:

the fully-downloaded representative video is a complete version of the first streaming video file that includes less information than the first streaming video file, but comprises each and every frame included in the first streaming video file, and the fully-downloaded representative video file includes more information than the initial fully-downloaded representative video file;

receiving a third input of the navigation tool for a different portion of the first streaming video file; and based on navigation information associated with the initial, fully-downloaded representative video file, causing the playback engine to navigate to the different portion of the first streaming video file.

13. The non-transitory computer readable medium of claim 12, wherein the fully-downloaded representative video file has a lower pixel resolution than the first streaming video file.

14. The non-transitory computer readable medium of claim 12, wherein a number of frames in the fully-downloaded representative video file selected by the navigation tool is based on a pixel width of a timeline slider associated with the first streaming video file.

15. The non-transitory computer readable medium of claim 12, wherein a total number of frames selected by the navigation tool from the fully-downloaded representative video file is no greater than a number of pixels that make up a width of a timeline slider associated with the first streaming video file.

16. The non-transitory computer readable medium of claim 12, wherein the fully-downloaded representative video file is received immediately prior to receiving the first streaming video file.

17. The non-transitory computer readable medium of claim 12, wherein the fully-downloaded representative video file is received concurrently with the first streaming video file.

18. The non-transitory computer readable medium of claim 12, wherein the navigation information is based on input information received from a viewer.

\* \* \* \* \*

UNITED STATES PATENT AND TRADEMARK OFFICE
CERTIFICATE OF CORRECTION

| | |
|---|---|
| PATENT NO. | : 11,314,405 B2 |
| APPLICATION NO. | : 13/651317 |
| DATED | : April 26, 2022 |
| INVENTOR(S) | : Matejka et al. |

It is certified that error appears in the above-identified patent and that said Letters Patent is hereby corrected as shown below:

In the Claims

Column 10, Claim 12, Lines 40-41, please delete "initial,".

Signed and Sealed this
Second Day of August, 2022

Katherine Kelly Vidal
*Director of the United States Patent and Trademark Office*